UNITED STATES PATENT OFFICE.

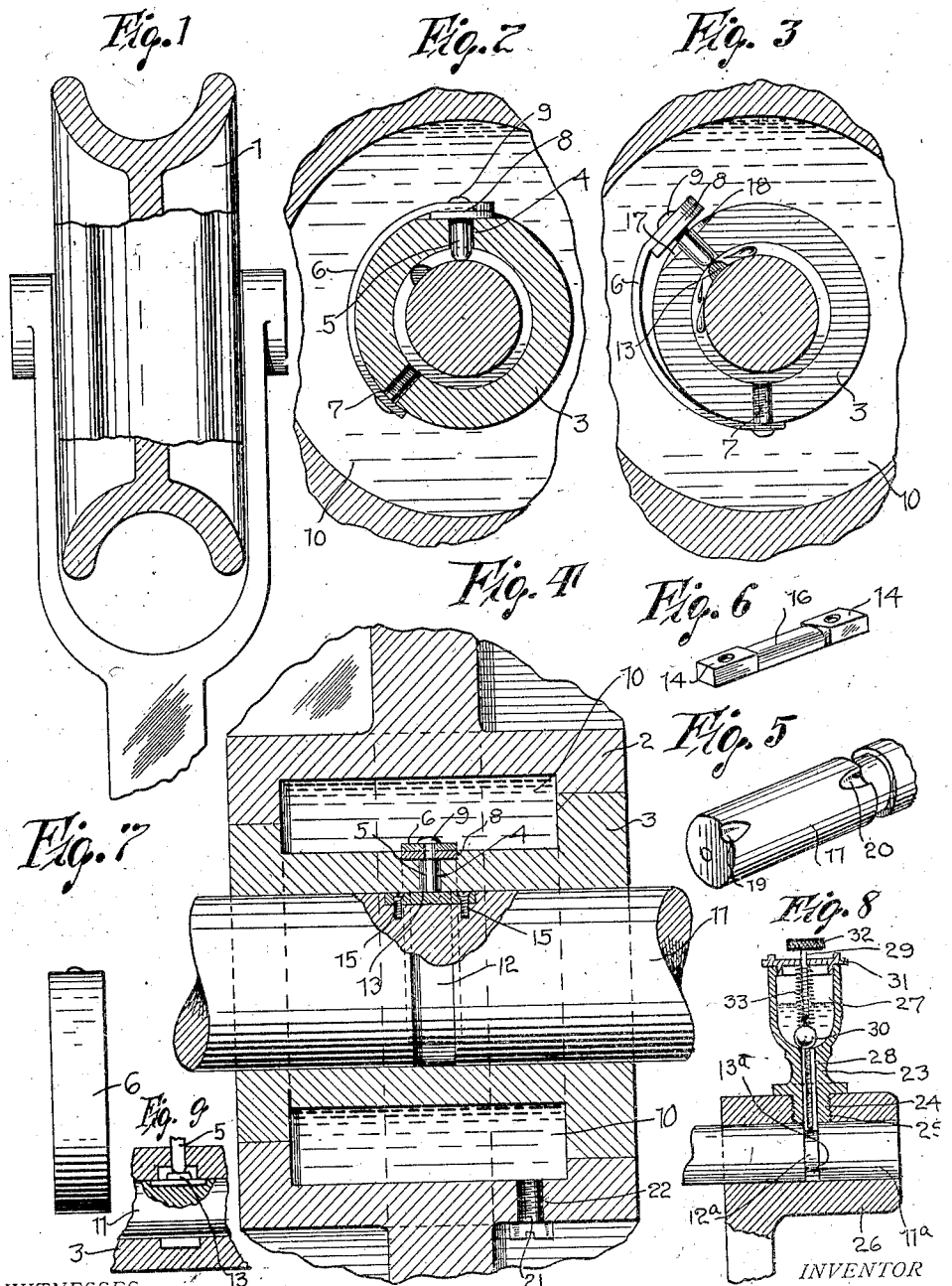

BENJAMIN F. FOWLER, OF MINNEAPOLIS, MINNESOTA, ASSIGNOR OF ONE-HALF TO JAMES ASPDEN, OF EXCELSIOR, MINNESOTA.

LUBRICATING-HUB.

1,043,684.  Specification of Letters Patent.  Patented Nov. 5, 1912.

Application filed January 18, 1912. Serial No. 671,916.

*To all whom it may concern:*

Be it known that I, BENJAMIN F. FOWLER, a citizen of the United States, residing at Minneapolis, in the county of Hennepin and State of Minnesota, have invented certain new and useful Improvements in Lubricating-Hubs, of which the following is a specification, reference being had therein to the accompanying drawing.

This invention relates to lubricating hubs, and has special reference to a hub which is adapted to be used in connection with a trolley wheel.

One of the principal objects of this invention is the production of automatic valve means coöperating with the hub of a trolley wheel whereby the oil may be automatically fed to the journal pin.

Another object of this invention is the production of a simple and efficient automatic valve means which may be easily and readily attached to the hub of a trolley wheel.

With these and other objects in view this invention consists of certain novel constructions, combinations, and arrangements of parts as will be hereinafter fully described and claimed.

In the drawings:—Figure 1 is an end elevation of the trolley wheel showing the same connected to the harp, the trolley wheel being partly shown in section. Fig. 2 is a transverse section through the hub of the trolley wheel showing the valve in a closed position. Fig. 3 is a view similar to Fig. 2 showing the valve in an open position. Fig. 4 is a longitudinal section through the trolley wheel. Fig. 5 is a detail perspective of one end of the journal pin. Fig. 6 is a detail perspective of the raising lug for the valve. Fig. 7 is a rear elevation of the spring for supporting the valve upon the hub. Fig. 8 is a modified form of the invention wherein the oil control cup is carried by the harp or other stationary journal. Fig. 9 is a section of a modified form of the lubricating device wherein the socket is carried by the journal instead of the pin.

Referring to the accompanying drawings by numerals 1 designates the trolley wheel which has a similar construction to the wheel as disclosed in my application filed October 7, 1911, Serial No. 653,367, relating to self-lubricating hubs. The hub 3 is provided with an inlet aperture 4 in which works the depending pin 5 which is carried by the spring 6 of the valve. The spring 6 has its inner end connected to the hub 3 by means of a screw 7, the spring 6 being bowed to fit snugly against the sides of the hub 3, while the valve is in a closed position. A washer 8 is carried by the free end of the spring 6, and this washer is held in place through the medium of the rivet 9 and depending pin 5. Of course, it should be understood that the inlet aperture 4 is of slightly greater dimensions than the pin 5 so that the oil may pass from the receptacle 10 through this aperture on to the journal pin 11. This journal pin 11 is provided with a circumferential groove 12 which groove is adapted to fit directly below the pin 5 so that said pin may travel within the groove.

A raising lug 13 is carried by the journal pin 11, and spans the groove 12 formed in the pin 11. The lug 13 is provided with a pair of squared ends 14 through which screws 15 pass, for securing the lug 13 to the pin 11. The central portion 16 of the lug 13 is rounded as illustrated in Figs. 2, 3 and 6 so as to allow the rounded end of the pin 5 to readily pass thereover. As the trolley wheel 1 rotates, the journal pin 11 being stationary, it will be obvious that the pin 5 will be raised as the same passes over the lug 13, thereby allowing the liquid to pass through the aperture 4, and on to the journal pin 11. Of course, the lubricant will pass into the groove 12, but will easily work laterally upon the pin. The hub 3 is provided with a pocket 17 in which is adapted to fit the washer 8 when the valve is in a closed position. It will, therefore, be obvious that through the medium of the side walls 18, the spring 6 will be held against lateral swing.

The journal pin 11 is provided upon one end with a notch 19 for facilitating the placing of the journal pin within the hub 3 while the valve is in a closed position, thereby doing away with the necessity of manually raising the valve or spring 6. The pin 11 is also provided with a notch 20 similar to the notch 19, near the groove 12 for facilitating the withdrawal of the pin from the hub when it is so desired.

The lubricant may be placed within the receptacle 10 formed between the hub 3 and wheel 1 by removing the screw 21 which is threaded into an aperture 22.

From the foregoing description it will be obvious that a very efficient and durable valve device has been produced which is absolutely automatic in its operation and owing to the shielded condition thereof, will not be likely to readily get out of order.

In the embodiment disclosed in Fig. 8, the oil cup 23 has its depending threaded end 24 threaded into the aperture 25 formed upon the boxing 26. Of course, the pin 11ª is preferably used and, like the pin 11, is provided with a circumferential groove 12ª carrying a raising lug 13ª as illustrated in Fig. 8. The cup 23 is provided with a lubricant containing receptacle 27 which has a drain opening 28 communicating with the shaft 11ª and plunger rod 29 is carried within the aperture 28 which is formed of larger dimensions than the head 29. A ball 30 is threaded upon the stem or rod 29 as illustrated and may be adjusted to control the flow of lubricant from the receptable 27. A top 31 is carried by the receptacle 27, and the plunger 29 works in the top as illustrated. A knob 32 is carried by the upper end of the rod 29 for limiting the downward movement of the plunger 29, and also allowing the ball to be threaded thereon. A coil spring 33 is interposed between the top 31 and ball 30 for normally holding the rod 29 in engagement with the shaft 11ª. Of course, it will be understood that as the raising pin 13ª comes in contact with the lower end of the plunger 29 the ball 30 will be raised from its seat thereby allowing the lubricant to flow from the cup 29.

Of course, it should be understood that the construction illustrated in the drawings and especially that as illustrated in Figs. 8 and 9 may be used for a journal of any desired type, and is not restricted to use merely in connection with the trolley poles.

What is claimed is:—

1. A lubricating device of the class described comprising a hub, a journal pin having a circumferential groove intermediate its ends, a valve stem normally extending into said hub and in the path of movement of said journal pin, said pin being provided with a tapering inclined notch formed at one end for facilitating the placing of said pin within said hub, said pin also being provided with a tapering inclined notch adjacent said circumferential groove for facilitating the withdrawing of said pin from said hub whereby said valve stem will be raised out of the path of movement of said journal pin, a reciprocating valve carried by said hub, and means positioned within said circumferential groove for raising and lowering said valve.

2. A lubricating device of the class described comprising a journal pin, a hub, a valve member carried by said hub, an elevating lug carried by said journal pin, said journal pin being provided with a circumferential groove, said elevating lug spanning said groove and being provided with squared ends engaging said journal pin upon said circumferential groove, means passing through said squared ends for holding the same in engagement with said journal pin, said squared ends assisting in holding said elevating lug against independent rotation relative to said journal pin, and a rounded portion formed intermediate the ends of said elevating lug and being adapted to operate said valve member for allowing the flow of lubricant to said journal pin.

In testimony whereof I hereunto affix my signature in presence of two witnesses.

BENJAMIN F. FOWLER.

Witnesses:
A. C. MIDDELSTADT,
H. J. NOLDEN.